United States Patent
Hildstrom

(10) Patent No.: US 10,318,209 B2
(45) Date of Patent: Jun. 11, 2019

(54) SECURE FILE TRANSFER TO PROCESS

(71) Applicant: Forcepoint LLC, Austin, TX (US)

(72) Inventor: Gregory Alan Hildstrom, San Antonio, TX (US)

(73) Assignee: Forcepoint LLC, Austin, TX (US)

( * ) Notice: Subject to any disclaimer, the term of this patent is extended or adjusted under 35 U.S.C. 154(b) by 242 days.

(21) Appl. No.: 15/419,093

(22) Filed: Jan. 30, 2017

(65) Prior Publication Data

US 2018/0217783 A1    Aug. 2, 2018

(51) Int. Cl.
*G06F 3/06*    (2006.01)

(52) U.S. Cl.
CPC .......... *G06F 3/0659* (2013.01); *G06F 3/0622* (2013.01); *G06F 3/0643* (2013.01); *G06F 3/0647* (2013.01); *G06F 3/0683* (2013.01)

(58) Field of Classification Search
CPC .... G06F 3/0659; G06F 3/0622; G06F 3/0643; G06F 3/0647; G06F 3/0683; G06F 3/0623; G06F 3/0673
See application file for complete search history.

(56) References Cited

U.S. PATENT DOCUMENTS

| | | | | |
|---|---|---|---|---|
| 2007/0255942 A1* | 11/2007 | Weller | ..................... | G06F 21/53 713/151 |
| 2008/0077988 A1* | 3/2008 | Small | ................. | G06F 11/3476 726/22 |
| 2008/0244206 A1* | 10/2008 | Heo | ....................... | G06F 12/145 711/163 |
| 2010/0269120 A1* | 10/2010 | Manttari | ................. | G06F 9/468 719/313 |
| 2011/0238984 A1* | 9/2011 | Roush | ..................... | G06F 21/53 713/166 |
| 2014/0032515 A1* | 1/2014 | Vaghani | .................. | G06F 17/00 707/704 |
| 2014/0283131 A1* | 9/2014 | Rozenberg | .......... | G06F 21/6209 726/28 |
| 2017/0032118 A1* | 2/2017 | Carson | .................... | G06F 21/52 |
| 2017/0032123 A1* | 2/2017 | Carson | ................. | G06F 21/567 |

\* cited by examiner

*Primary Examiner* — Michael Krofcheck

(74) *Attorney, Agent, or Firm* — Schwegman Lundberg & Woessner, P.A.

(57) ABSTRACT

Discussed herein are methods, devices, and systems for moving a file to a process. A device can include a kernel, a memory, and processing circuitry to: issue one or more move and rename instructions to the memory to change a location and name of a file requested by the second process, issue one or more update access control instructions to update permissions, perform a UAC to determine whether any processes other than the second process currently have the file open and whether any MMaps have the file open, and allow the second process to access the renamed and moved file only if it is determined that no other processes other than the second process have the file open and no MMaps have the file open.

20 Claims, 9 Drawing Sheets

SECURE FILE TRANSFER TO PROCESS

TECHNICAL FIELD

One or more embodiments relate to communication between components within a device, such as a device that operates using file I/O.

TECHNICAL BACKGROUND

File input and output (I/O) is often a convenient method to transfer data to one or more processes running on the same computer, but there are many associated challenges. It is often desirable to restrict the directionality of file inter-process communication (IPC). For example, a user may want process A to send data to process B, but not vice versa. Another additional or alternative desire may include not bypassing a process in a multi-process data flow. For example, the user may not want process A to send data to process C in an A to B to C sequential data flow.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DESCRIPTION OF EMBODIMENTS

Figure 1:
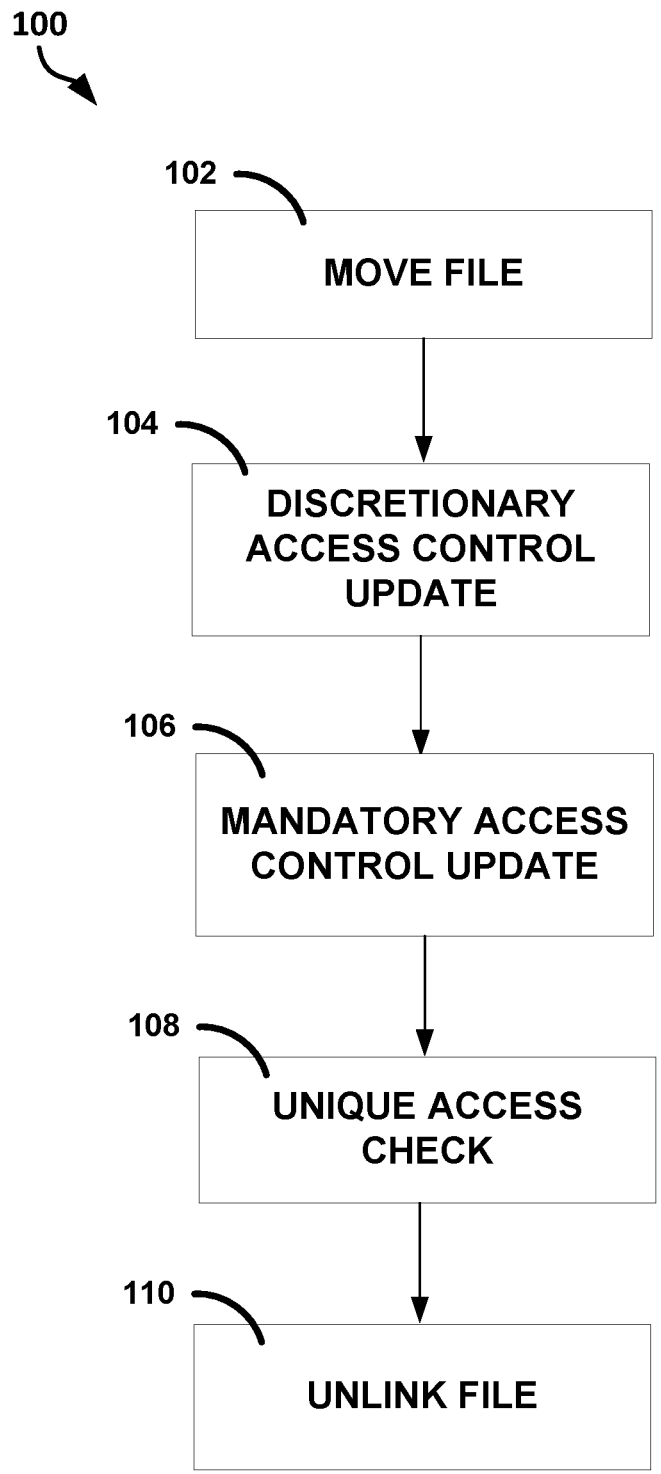
FIG. 1 illustrates, by way of example, a flow diagram of an embodiment of a method for moving a file, such as in a file I/O system.

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims. Some embodiments relate to providing a file to a process, such as for the process to access or operate on the file.

On operating systems enforcing discretionary and/or mandatory access controls, such as conventional UNIX, UNIX-like, Linux operating systems, or other file I/O systems, unidirectional file inter-process communication (IPC) is difficult to do securely and efficiently (in terms of time and resources used). Generally, efficient solutions are not secure and secure solutions are not efficient. Embodiments of this disclosure can help enable unidirectional file IPC in a manner that is both secure and efficient. Such embodiments can help improve the overall security and data processing performance of multi-process solutions.

A move-based solution to file transfer is time and resource efficient, but not secure. A move-based solution can rely on the my command, link( ), and/or unlink( ) system calls, or the rename( ) system call. When move is used within a file system, the file contents are not read or copied. Only the pointers (directory entries) to the file data (e.g., inode) are updated, which involves a small amount of I/O capacity to the underlying storage media. As a result, the move is fast and efficient, with generally constant execution time regardless of the size of the file.

Unfortunately, any processes that had the file open during the move may read or write the file contents after the move, thus move is not secure. The impact of this can be reduced somewhat with discretionary access controls (DAC) and mandatory access controls (MAC) (e.g., mandatory access, discretionary access, or the like), but time-of-check to time-of-use (TOCTTOU) problems with memory-mapped (MMap) file buffers remain. TOCTTOU problems remain, since access controls are applied at the time of mmap( ) and not at the time of MMap buffer use, thus directionality and non-bypassability are not guaranteed.

The copy-based solutions are secure, but not efficient. These solutions typically rely on the cp command or read( ) and write( ) calls to separate files. With proper DAC and MAC restrictions and a pull approach, both directionality and non-bypassability can be guaranteed. For example, process B copies a file written by process A and DAC/MAC restrictions can prevent process A from accessing the new file. If process A has the source file open or MMapped, it cannot alter or read the file process B created, such as with the proper DAC and/or MAC restrictions in place.

A pull approach to file movement includes the process consuming the file data initiates the file move operations. In a push approach to file movement, the process producing the file is the one to initiate the file move operations.

Unfortunately, the entire file contents must be read and written using a copy-based solution, which consumes more I/O than a move approach. The non-constant execution time scales with the file size in a copy-based approach. The I/O could be in memory when the file is cached by the operating system (OS) or when the file is on a memory-backed file system. The I/O could also be actual I/O to persistent storage media, which is slower than I/O in memory. The data duplication inefficiency also scales by the number of file IPC hops the data traverses, so the copy approach can become a bottleneck, such as with large numbers of processes and/or large numbers of iterations.

In some file I/O systems, such as Linux or Unix, among others, files are directory entries in a computer associated with one or more inode numbers (sometimes referred to as i-numbers), or something similar, that are a pointer to the data of the file. The i-number is used as an index into a system table ("i-list"). The entry in this table corresponding to the i-number is the file's inode. An inode is a data structure that describes a system object, such as a file or directory. The computer translates the inode numbers into inode locations on disk, if the file is on the disk. The inode can include file statistics, permission, and/or file data pointers. The inodes generally do not include file names, and can include file metadata. The metadata can include owner identification, group identification, size of the file, device identification (of the device on which the file is stored), file type, access permissions, timestamp (e.g., when inode was last modified, file content last modified, and/or file last accessed), a link count indicating how many hard links point to the inode, and/or pointers to locations of memory at which file contents can be found. Structures similar to inodes can include stat data, such as can be used in some Unix systems, and vnodes, such as can be used in some Berkeley Software Distribution (BSD) systems.

In some embodiments, files are not sockets, not pipes, and not transmitted transmission control protocol/internet protocol (TCP/IP). Packets are transmitted using TCP/IP. Payloads of packets can be arranged to form a file, but the file itself is not transmitted using TCP/IP, a packet is transmitted. A packet is a chunk of data on some streaming mechanism, file I/O is not such a streaming mechanism.

Using an inode-based file system, a file can have multiple names. That is, multiple names can hard link to a same inode. Thus, when opening a file, another file of a different name can be used by another or the same application and linked back to the same inode. Such a situation creates a security risk, as the file of a different name, linked to the same inode, can be modified or otherwise exploited and affect the other file linked to the same inode.

FIG. 1 illustrates, by way of example, a flow diagram of an embodiment of a method 100 for moving a file, such as in a file I/O system. The method 100 as illustrated includes moving a file, at operation 102; updating DAC, at operation 104; updating MAC, at operation 106; performing a unique access check (UAC), at operation 108; and optionally unlinking a file, at operation 110. The method 100 is sometimes referred to herein as an embodiment of a secure move process. The method 100 can provide directionality and non-bypassability guarantees that can be provided by copy-based approaches, such as those previously discussed. The method 100 can provide an increased efficiency over the copy-based approaches, such as to reduce processing time and/or reduce I/O used in performing the process. An example of prototype code for implementing the method 100 is provided in Appendix A.

In one or more embodiments, the operation 102 can be performed by performing a rename( ) command. The operation 102 moves the file to a new directory and/or with a new file name. The operation 102 can be performed before or after any of the operations 104, 106, 108, or 110. The operation 102 can originate from user space or kernel space. The operation 102 can help make opening the file more difficult for other processes, as the other processes may not be aware of the new file location and/or new file name.

A "command", "function", and "system call", as used herein, are different. A command is a program that is executed, such as can be initiated in a user space. The command can include one or more functions to be executed in performing the command. The functions can execute system calls for performing the operations of the functions. A function is executed by the OS. A function is generally initiated in and executes in user space. A system call is executed in kernel space.

The operation 104 can include updating ownership of the file. The operation 104 can include updating DAC permission of the file. The operation 104 can include changing ownership of the file, such as to allow MAC permissions to be updated by the process. In some instances, changing the ownership is unnecessary, such as if the process has a cap_fowner( ) capability, such as when running as a non-root user, such as can allow DAC permissions and MAC permissions to be updated without owning the file. Alternatively, if the process is running as a root user, DAC and MAC permissions can be updated without changing ownership of the file.

The DAC permissions can be updated to prevent or restrict group access. The operation 104 can be implemented in user space or kernel space. The operation 104 helps prevent processes without appropriate DAC permissions from opening the file. The operation 104 can allow the operation 106 to be performed. The operation 104 can include performing a chown( ) or cap_chown( ) system call, such as to allow the process calling the method 100 to take ownership of the moved/renamed file. The operation 104 can include providing full access (read and write) for an owner of the file, restricting access of a group to read only or no access, and/or read only or no access for other users, with no access for group or other users, such as by using a chmod( ) system call. In one or more embodiments, the operation 104 can be restricted by a security policy, such as can be defined by the MAC.

The operation 106 can include updating MAC permissions such that sonic processes are prevented from opening, reading, or writing the file. The operation 106 can be implemented in user space or kernel space. The operation 106, in embodiments that include using security-enhanced Linux (SELinux), or other similar MAC policy implementation, the policy type (e.g., SELinux type) of the file can be updated. The operation 106 can include performing a setfilecon( ) and/or setattr( ) system call, such as to change the type of the file.

The operation 106 can include updating a type of file in a security policy. In one or more embodiments, a first file type can indicate that a file is free to be operated on (assuming other permissions are met by a process to operate on the file), a second file type can indicate that a file is "checked out" for operation by a process.

Not all systems include MAC permissions. In such systems, the operation 106 can be skipped.

The operation 108 can include performing a hard link inode check. The operation 108 can include performing a file descriptor inode check. The operation 108 can include performing an MMap inode check. The operation 108 checks the number of hard links to the file, detects any file descriptors or MMaps open by other processes, and prevents using files that are still accessible by other processes. Example prototype code for implementing a portions of a secure move process in user space is provided in Appendix B. Example prototype code for implementing a portion of a secure move process in kernel space is provided in Appendix C.

If another process has the same file or a different file that maps to the same inode open, the unique access check can indicate that the access is not unique. If no other process has the same file or a different file that maps to the same inode open, the unique access check succeeds. The operation 108 can originate in user space and/or kernel space. In one or more embodiments, performing the file descriptor inode check and performing MMap inode check originate in kernel space. Such a configuration, helps prevent TOCTTOU security problems present in user space implementations. Such as configuration also requires fewer DAC and MAC permissions, as compared to implementations that originate in user space.

An implementation in which the operation 108 originates in user space can require more permissions than a kernel space implementation of the operation 108. Also, the user space origination of the operation 108 is generally slower than a kernel space origination. Further yet, a user space origination may not catch a fork, parent-close, new child lower process identification number (pid), and open child fd or MMap problem. A kernel space origination can include an lseek( ) system call, such as is shown in Appendix C. The lseek( )system call verifies that the calling process (the process to access the file) has the requested inode open (proper file access permission check), searches a snapshot of a process task list, associated open file structures, and associated virtual memory structures for open file descriptors and/or MMaps as that of the file to be accessed. Such a check, after proper DAC and MAC updates at operations 104 and 106, can help prevent TOCTTOU problems.

Unlike a copy-based approach, the method 100 does not require having MAC/DAC permissions to write to the file as the file is moved and not copied. This change helps protect the data of the file. Consider a processes only involved in the movement of the file and not in writing to the file. The process can be restricted from altering the file data, such as by restricting the MAC/DAC permissions for such processes to not include write permissions, such as in the operation 106. The operation 110 is optional and can be performed if the operation 108 indicates that the access is not unique, sometimes referred to as shared access, or any of the operations 102, 104, and/or 106 fail. The operation 110 can include performing an unlink( ) system call.

In one or more embodiments, to help ensure security (e.g., directionality and/or non-bypassability), the operation 106 is performed only after the operation 104 is complete, the operation 108 is performed after the operation 106 is complete, and the operation 110 is performed only after the operation 108 is complete or any of the operations 102, 104, 106, and/or 108 fail. The operations 102, 104, and 106 together, help achieve a same new file name and DAC/MAC protections provided by a copy-based approach previously discussed, but without needing to copy the file. After these operations, another process, without permitted access, can be prevented from opening the moved file. With operation 108, a file that still open or MMapped in another process cannot be used by a process implementing secure move. Thus, secure move protects against new access and existing access to the file. The method 100 described can provide directionality and non-bypassability, but with improved time efficiency over the copy-based solutions.

In one or more embodiments, if any of the operations of the method 100 fail, a new file created using the operations of the method 100 can be deleted, such as by performing an unlink( ) system call. In one or more embodiments, a copy-based approach, such as a copy-delete technique, can be performed if the secure move technique fails. In one or more embodiments, a process can perform a secure move technique on a file that it is to operate on or use. The process can perform operations on the files of the type created by the secure move technique. After the process completes its operations on the file, the process can make the file available for a next process (or another process) by performing a DAC or MAC update, such as to change group access permissions, ownership, file type, and/or other user access permissions.

Figure 2:
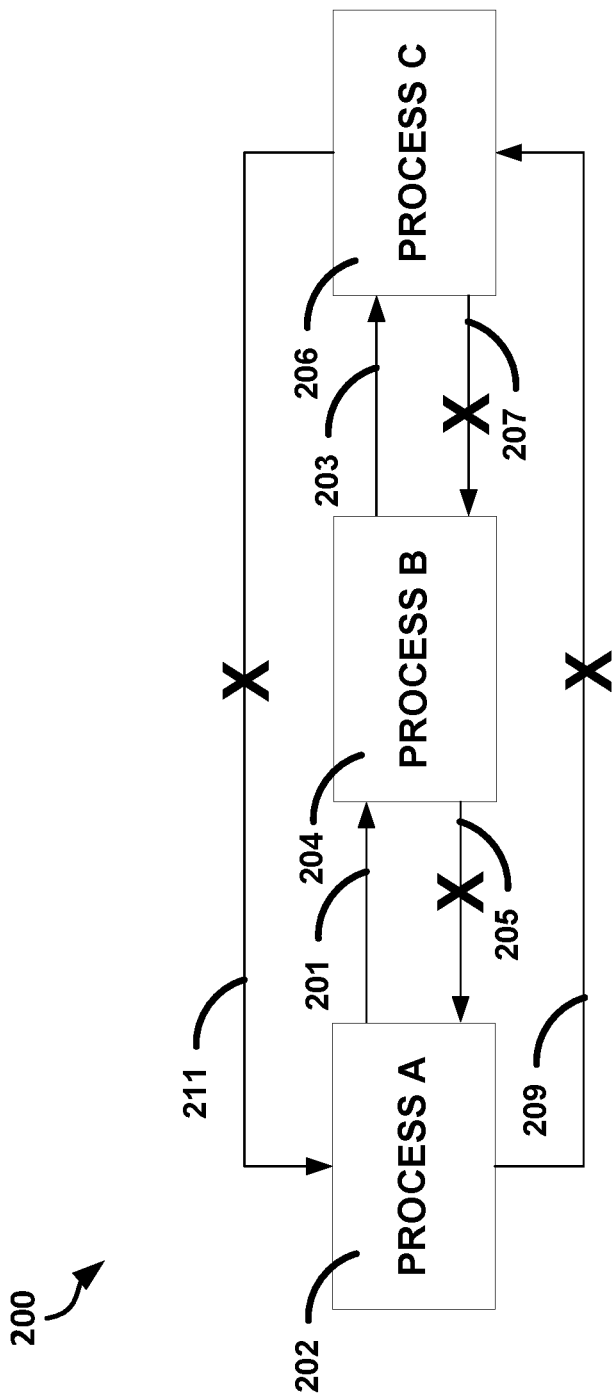
FIG. 2 illustrates, by way of example, a data flow diagram of an embodiment of a data flow in a system when a secure move process is operating without a compromised process.

FIG. 2 illustrates, by way of example, a data flow diagram of an embodiment of a data flow in a system 200 when secure move is operating without a compromised process. The system 200 includes three processes, process A 202, process B 204, and process C 206. In the system 200, process B 204 requests data from process A 202 and process C 206 requests data from process B 204. Generally, an "X" on a connection means that data is not permitted to flow in the direction indicated by the connection and an "X" on a process means that process is compromised.

Invoking secure move in process B 204, the data from process A 202 is allowed to travel from process A 202 to process B 204 as indicated by connection 201 (assuming that the unique access check of secure move does not fail). Using secure move, the data from process B 204 is not allowed to travel from process B 204 to process A 202. Invoking secure move in process C 206, the data from process B 204 is allowed to travel from process B 204 to process C 206 as indicated by connection 203 (assuming that the unique access check of secure move does not fail). Using secure move, the data from process C 206 is not allowed to travel from process C 206 to process B 204 as indicated by connection 207. Using secure move, the data from process A 202 is not allowed to travel from process A 202 to process C 206 as indicated by connection 209. Using secure move, the data from process C 206 is not allowed to travel from process C 206 to process A 204 as indicated by connection 211.

Figure 3:
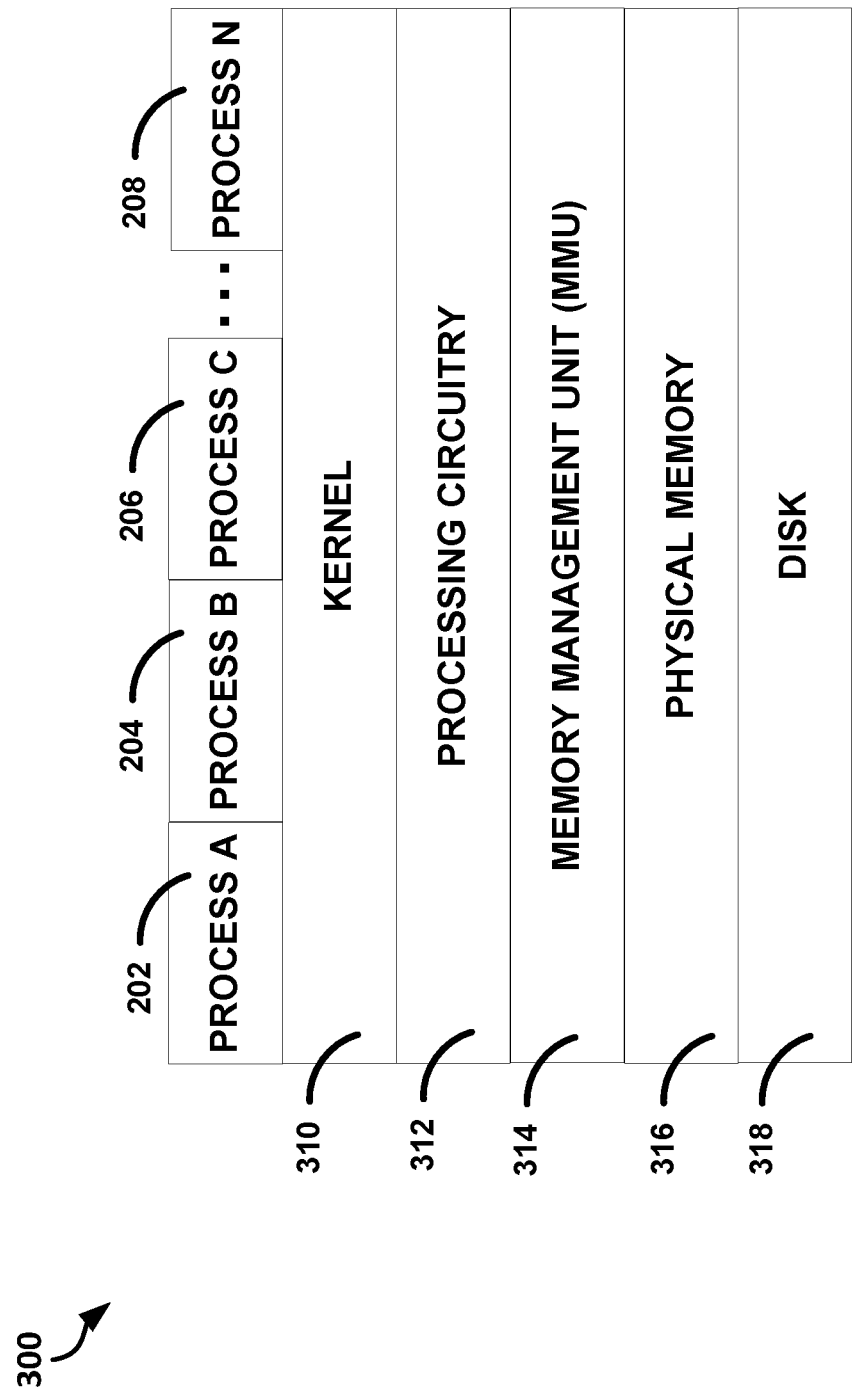
FIG. 3 illustrates, by way of example, a diagram of an embodiment of a system which can perform a secure move process.

FIG. 3 illustrates, by way of example, a diagram of an embodiment of a system 300 which can perform a secure move process. The system 300 as illustrated includes a plurality of processes including the process A 202, the process B 204, the process C 206, and a process N 208, a kernel 310, processing circuitry 312, memory management unit 314, physical memory 316, and a disk 318. The processes 202, 204, 206, and 208 communicate, such as with each other or the kernel 210, using files. The kernel 310 manages I/O requests and system calls from the processes 202, 204, 206, and 208. The kernel 310 is a part of an operating system. The kernel 310 translates I/O requests into data processing instructions for the processing circuitry 312. The kernel can manage communication with peripheral devices connected to the system 300. The executable instructions that are part of the kernel 310 are stored in a protected area of memory (read only memory (ROM)). The operations performed by the kernel 310 are performed in kernel space 404 (see FIG. 4) and operations performed by the processes 202, 204, 206, and 208 are generally performed in user space 402 (see FIG. 4). Retrieving data from another process can be performed partially in user space and partially in kernel space, such as by using a secure move process. The kernel 310 manages process access to the processing circuitry 312. The kernel 310 issues commands to the processing circuitry 312.

The processing circuitry 312 performs operations specified by the kernel 310. The processing circuitry 312 can include a central processing unit (CPU), such as can include electric or electronic components, such as can include one or more transistors, resistors, capacitors, diodes, inductors, logic gates, voltage, current, or power regulators, traces, vias, oscillators, analog to digital converters (ADC), digital to analog converters (DAC), buffers, multiplexers, or the life. The processing circuitry 312 performs arithmetic, logical, control, and I/O operations as specified by the kernel 310. The processing circuitry 312 can access the memory 316 or 318, such as through the memory management unit (MMU) 314.

The MMU 314 is a hardware unit through which memory references pass. The MMU 314 translates virtual memory addresses to physical addresses. The MMU 314 can perform memory protection, such as to help ensure that a process that requests data is allowed to access the data. The MMU 314 provides requests for data (read or write requests) to the physical memory 316 (e.g., random access memory (RAM)) or the disk 318 (some memory outside of the hardware of a computer on which the physical memory 316 resides). The virtual memory can include a user virtual address space, a kernel virtual address space, and/or a physical memory virtual address space. In one or more embodiments, the processing circuitry 312 and the MMU 314 can be part of a same piece of hardware or different pieces of hardware.

Figure 4:
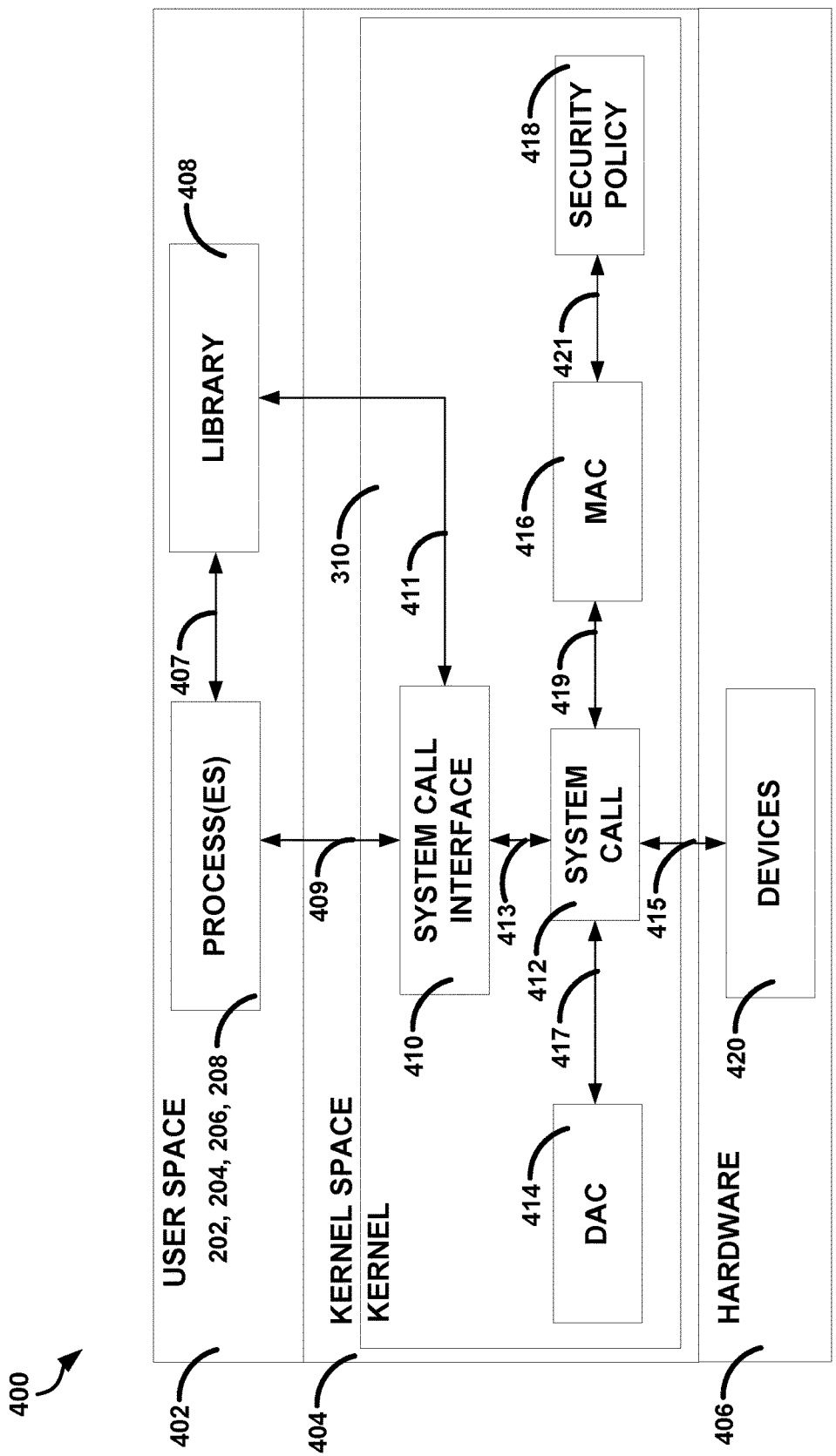
FIG. 4 illustrates, by way of example, a logical block diagram of an embodiment of a system for implementing a secure move process, such as the method of FIG. 1.

FIG. 4 illustrates, by way of example, a logical block diagram of an embodiment of a system 400 for implementing a secure move process, such as the method 100. The system 400 as illustrated includes a user space 402, a kernel space 404, and hardware 406.

The user space 402 includes the process(es) 202, 204, 206, and 208 in communication with a library 408, such as through a connection 407, and the kernel 310, such as through a connection 409. The library 408 is a collection of resources used by the processes 202, 204, 206, and 208. Note that a library 408 is optional and other embodiments, such as coding secure move into the process 202, 204, and 206 without a library function call, among other embodiments, can be used in lieu of the embodiment including the library 408 shown in FIG. 4. The resources can include configuration data, templates, function and/or sub-routine instructions, classes, value or type declarations, and/or the like. The library 408 is organized such that multiple processes 202, 204, 206 and/or 208 can access the functionality provided by the library 408. A process 202, 204, 206, and/or 208 only needs to know the interface, and not the working details, of the function provided by the library. For example, a process 202, 204, 206, and/or 208 can be implemented as a higher level language by implementing system calls or other functions in the library 408. In one or more embodiments, one or more functions or sub-routines of a secure move process can be implemented using the library 408. For example, a process 202, 204, 206, and/or 208 can call a secure_move( ) function, that is implemented using the library 408, such as when the process 202, 204, 206, and/or 208 is to retrieve data from another of the processes 202, 204, 206, and/or 208.

The kernel space 404 as illustrated includes a system call interface 410, a system call implementation 412, DAC 414, MAC 416, and one or more security policies 418. The system call interface 410 maps a system call to a particular system call implementation, such as the system call implementation 412.

The system call implementation 412 is implemented by the processing circuitry 312 executing instructions, such as in a memory. The system call implementation 412 help perform the functionality of the kernel 310. The system call module 412 can provide an instruction or request to a memory of the devices 420, such as to alter a name and/or change a location of a file that is the subject of a request from the process 202, 204, 206, and/or 208. The command or request to the memory (e.g., the physical memory 316 or the disk 318) can be provided on a connection 415.

The system call module 412 can implement system calls of the method 100. The systems calls of the method 100 can originate from the user space 402 or the kernel space 404. In one or more embodiments, one or more of the operations 102, 104, 106, a portion of the operation 108, and/or 110 can originate in the user space 402, such as by a process 202, 204, 206, and/or 208 or the library 408 making one or more calls to the system call interface 410. In one or more embodiments, one or more of the operations 102, 104, 106, a portion of the operation 108, and/or 110 can originate in the kernel space 404. A portion of the operation 108, such as performing a file descriptor inode check and/or an MMap inode check, can originate in the kernel space 404.

The DAC 414 includes permissions that can be changed by a user (e.g., an owner of the file or an entity that otherwise has sufficient DAC permissions, such as can be granted by the owner). The permissions of the DAC 414 can be accessed or changed by the system call module 412, such as by providing data on a connection 417. The permissions of the DAC 414 specify access privileges provided to other users or processes. The kernel 310 makes an access control decision (e.g., whether to allow or deny access) based on access privileges in the DAC 414 and/or in the MAC 416. The permissions of the DAC 414 can include who gets access privileges and/or what type of access (e.g., read or write) each user is allowed.

The MAC 416 includes a different type of permissions as compared to permissions of the DAC 414. The MAC 416 can enforce hierarchical and/or non-hierarchical security. Hierarchical security is a sort of security clearance for data. The security clearance, such as can be implemented by the processing circuitry 312, can include comparing a security clearance permission of a user to a security clearance permission of an object (e.g., a file in the example of a file I/O system). For example, security clearance permissions can include a hierarchy of permissions, such as (from least restrictive to most restrictive access control) public, secret, top secret, and/or confidential. A non-hierarchical security can include a type, such as an SELinux type.

A difference between MAC and DAC is that DAC is concerned with attributes of an entity (is the entity a member or not?), while MAC is concerned with attributes of an entity relative to attributes of data (does the entity have attribute(s) greater than or equal to attributes of the object?). DAC permissions are defined by the data owner or process, such as choosing read, write, or execute permissions for a new file. The data owner or creator has access control discretion. MAC permissions are defined by an OS MAC security policy. The data owner or creator has no discretion over these permissions, since they are mandatory. SELinux layers MAC on top of standard Linux/Unix DAC. A user or process must have both MAC and DAC permissions to operate on a file on a MAC system, such as SELinux.

The system call module 412 can access or update permission of the MAC 416, such as through a connection 419. The MAC 416 can update or access a security policy 418, such as through a connection 421. The security policy 418 and/or the MAC can be implemented using SELinux and/or MAC kernel module, in embodiments in which the system 300 and/or 400 includes a Linux-based computer.

The devices 420 can include the processing circuitry 312, the MMU 314, the physical memory 316, the disk 318, and/or any 110 devices, such as a keyboard, display, mouse, camera, microphone, speaker, a device connected to a Universal Serial Bus (USB), Ethernet, video graphics array (VGA) or other display port, or other device connected to or coupled to a port of the system 300 or 400.

Figure 5:
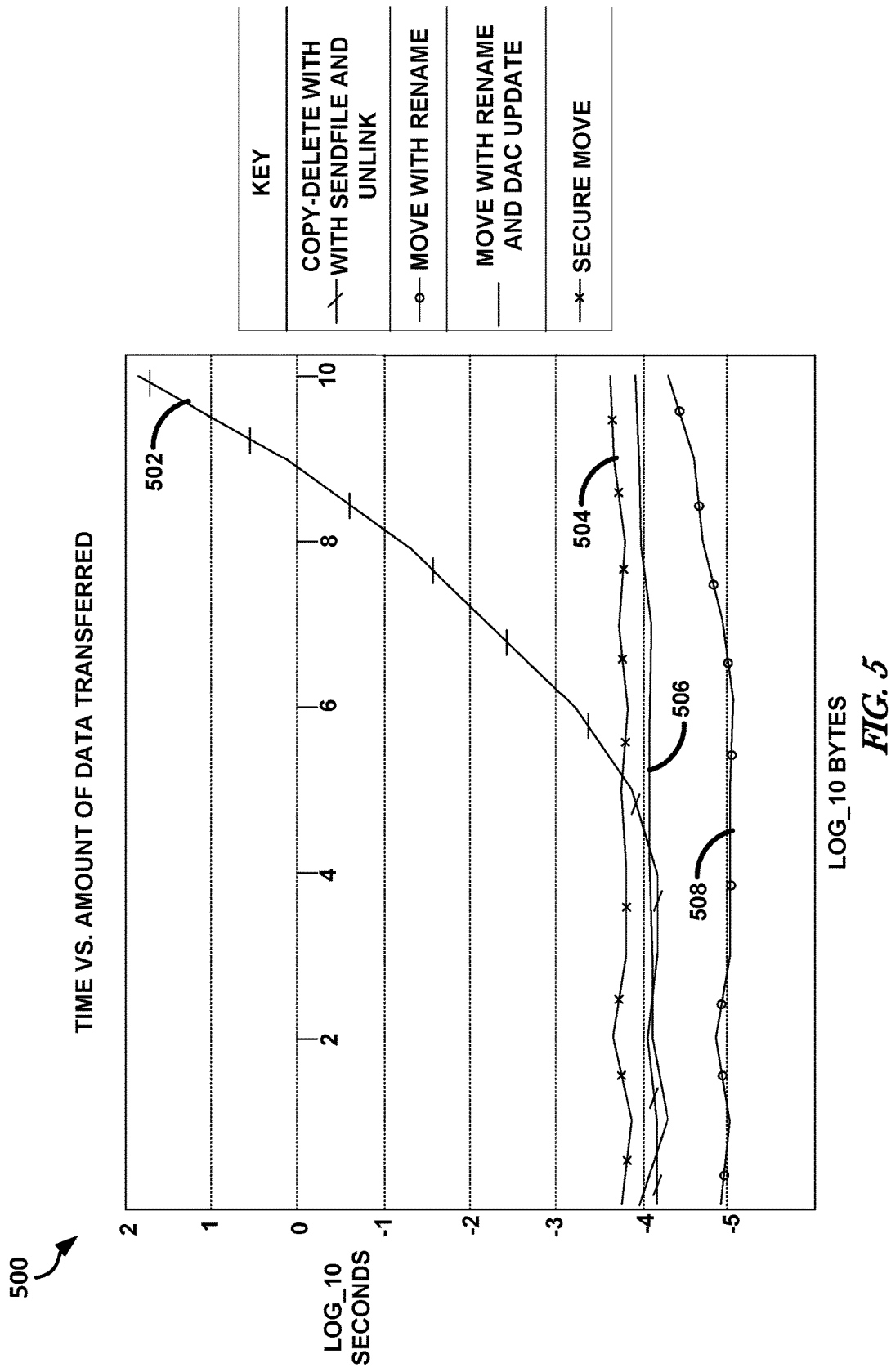
FIG. 5 illustrates, by way of example, a graph of time versus amount of data transferred for a variety of data transfer methods including a copy-based process, a few move processes, and a secure move process.

FIG. 5 illustrates, by way of example, a graph 500 of time versus amount of data transferred for a variety of data transfer methods including a copy-based process (line 502), a few move processes (lines 506 and 508), and a secure move process (line 506). As can be seen, the secure move process is slower than the move processes, but for sufficiently large amounts of data, is faster than a copy-based process. A time it takes to execute the secure move process and the move processes is generally independent of the amount of data being transferred. A time it takes to execute a copy-based process has no such independence, since the data needs to be copied, thus taking more time to copy bigger files.

The graph 500 indicates that a secure move process is faster than a copy-based approach for files larger than about 100 kilobytes. The secure move process tested took about one hundred eighty microseconds to execute. For a one-megabyte file, the secure move process is about three times faster than the copy-based approach. For a ten-megabyte file, the secure move process is about thirty-two times faster than the copy-based approach. For a one-hundred-megabyte file, the secure move process is about three hundred twelve times faster than a copy-based approach. For a one gigabyte file, the secure move process is about seven thousand six hundred times faster than the copy-based approach.

Figure 6:
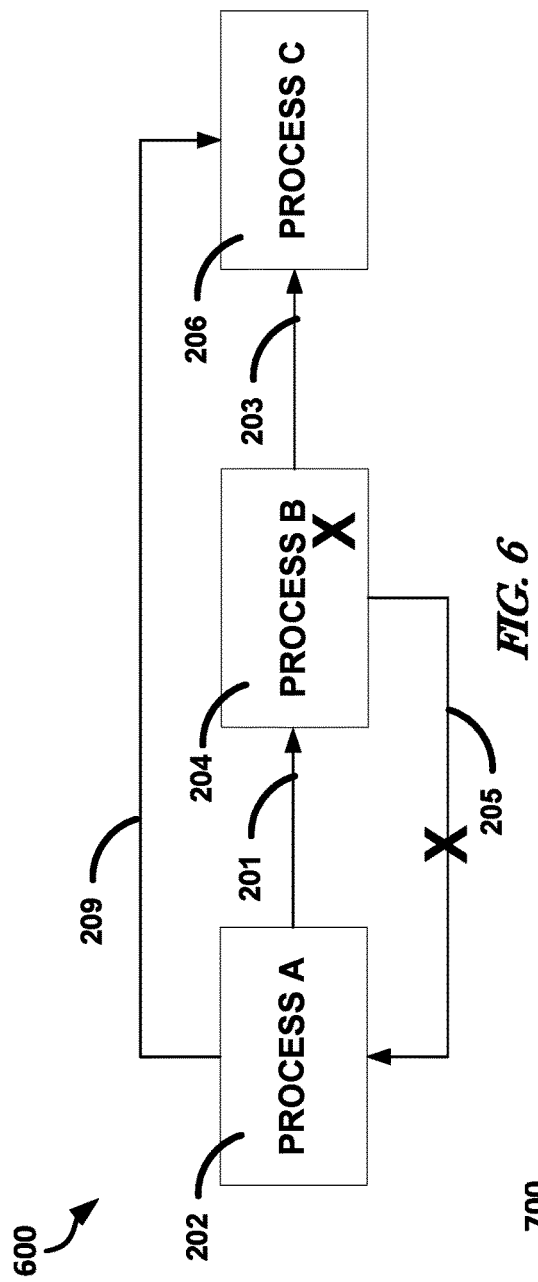
FIGS. 6 and 7 illustrate, by way of example, data flow diagrams and illustrating consequences of using secure move in situations in which one or more of the processes is compromised.
Figure 7:
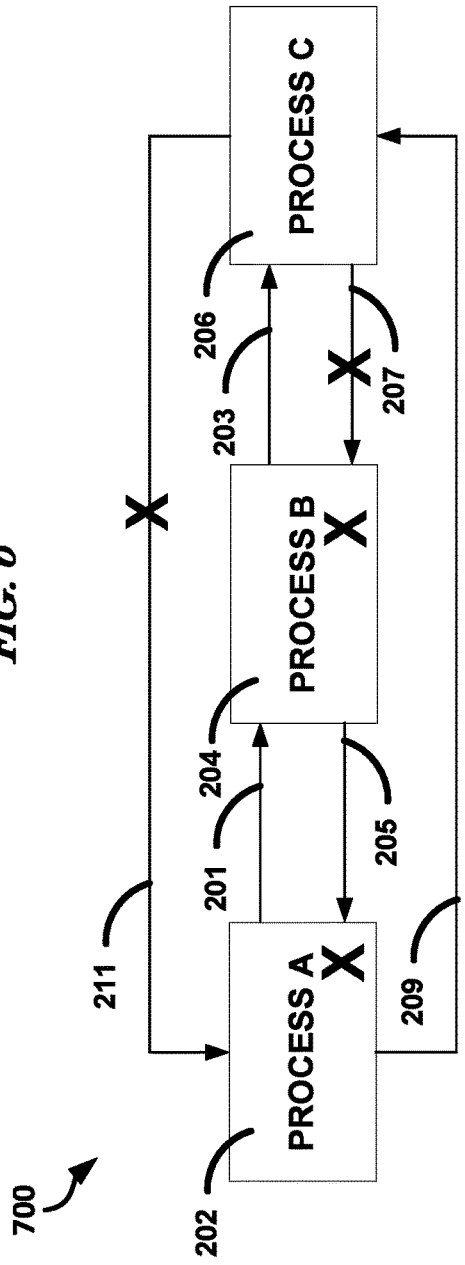

FIGS. 6 and 7 illustrate, by way of example, data flow diagrams 600 and 700 illustrating consequences of using secure move in situations in which one or more of the processes 202, 204, and 206 is compromised. In FIG. 6, the process B 204 is compromised (as indicated by the X on the box labelled "PROCESS B"). In such embodiments, and assuming that a secure move process is used to transfer files between the processes 202, 204, and 206, data can still flow from process A 202 to process B 204 and is still restricted from flowing from process B to process A. However, when process B is compromised, data can flow from process A 202 to process C 206, such as is indicated by the connection 209 not including an "X" on it.

In FIG. 7, the process A 202 and the process B 204 are compromised. In such a situation, data is free to flow between the processes 202 and 204, and to flow from the processes 202 and 204 to the process 206. The security of the system that implements secure move is thus compromised when two processes to access a file sequentially (one directly after the other) are compromised. A measure of security is still present when multiple processes are compromised, but none of the compromised processes are to access the file sequentially.

Figure 8:
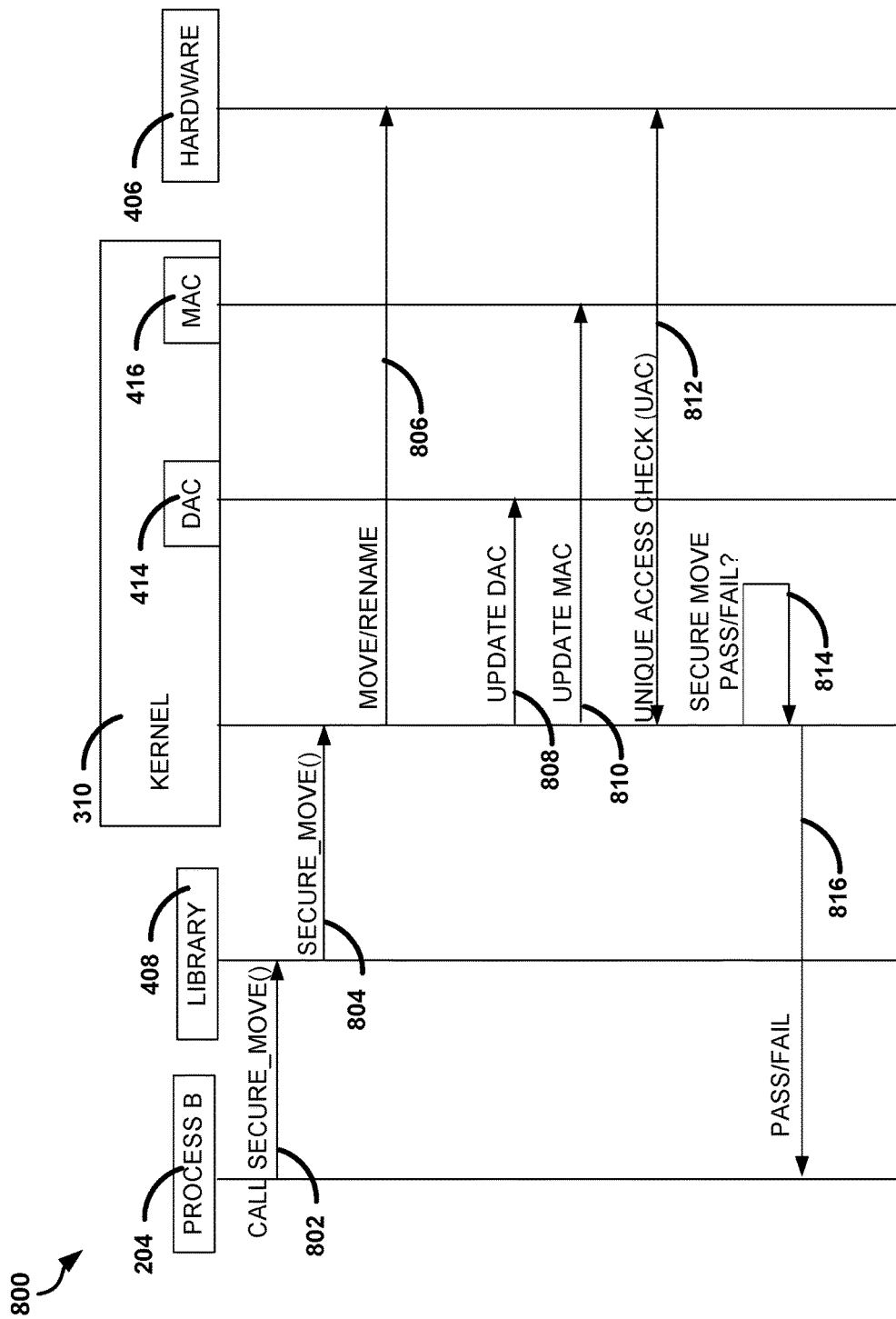
FIG. 8 illustrates, by way of example, a communication diagram of an embodiment of communications between components of a device.

FIG. 8 illustrates, by way of example, a communication diagram of an embodiment of communications 800 between components of a device. The components involved in the communications 800 can include the process B 204, the library 408, the kernel 310 and associated components, such as those shown in FIG. 4, and the hardware 406. The communications 800 are for a secure move process that originates in kernel space. See FIG. 9 and the prototypes in the Appendices for examples of secure move processes that originate in user space.

The process B can start a secure move process by snaking a call 802 to the library 408 to initiate a secure move process. Variables provided to the library 408 in the secure move call can include a file name, file path, new file name, new file path, new owner, new permissions (DAC and/or MAC), new type, among others. The library 408 can make a system call 804 to the kernel 310. The system call 804 can include the same variables as that provided by the process B 204 in the call 802. The secure move system call 804 can cause the kernel to perform system calls associated with a secure move function defined in the kernel space. The system calls can include a move/rename system call 806 to the hardware 406 (e.g., the MMU 314 and/or the processing circuitry 312). The move/rename system call can include an indication of the old file path and the new file path, among other variables. The system call can include an update DAC system call 808. The update DAC system call 808 can include an indication of a new owner, permissions to be associated with one or more entities, such as the new owner, group access, and/or other users. The permissions can include no access, read only, and/or read and write for each of the entities. The system calls can include an update MAC system call 810. The update MAC system call 810 can indicate a new file type of the file, such as to indicate that the file is checked out to a process and/or to reduce the chances of another process altering or otherwise accessing the file when the file type is changed.

The system calls can include one or more system calls to perform a unique access check 812. The unique access check 812 can include determining if any other processes have the file open (the renamed file, the original file, or any other files associated with the same inode renamed file), whether any other processes have file descriptors with the file open, and/or whether any memory maps have the file open. The kernel 310, such as with the help of the processing circuitry 312, can determine whether the secure move process passes or fails based on each of the system calls in 806, 808, 810, and 812, at operation 814. An indication of whether the secure move process passed or failed can be provided to the process B 204, such as is indicated by communication 816.

Figure 9:
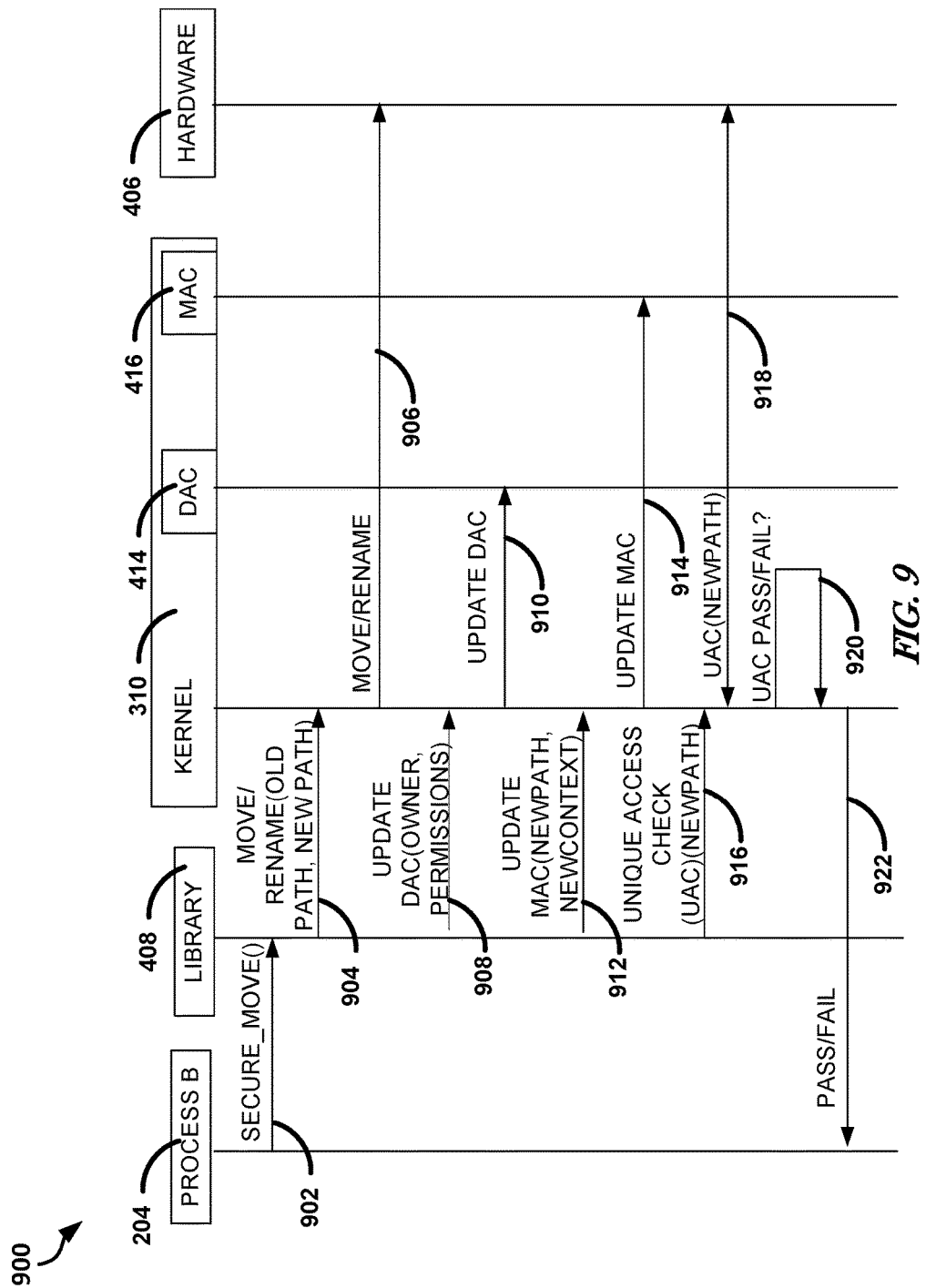
FIG. 9 illustrates, by way of example, a communication diagram of an embodiment of communications between components of a device.

FIG. 9 illustrates, by way of example, a communication diagram of an embodiment of communications 900 between components of a device. The components involved in the communications 800 can include the process B 204, the library 408, the kernel 310 and associated components, such as those shown in FIG. 4, and the hardware 406. The communications 900 are for a secure move process that originates in user space. See FIG. 8 for an example of a secure move process that originates in kernel space. The call 902 is similar to the call 802 and can include same or different variables from that of the call 802. The library 408 can then make system calls to the kernel 310 that cause the kernel 310 to initiate operations of the secure move process, rather than the library making a function call to the kernel to cause the kernel to initiate the operations of the secure move as in FIG. 8.

The library 408 can provide a move/rename system call 904 to the kernel 310. The kernel 310 can, in response, issue a move/rename call 906 to the hardware 406 that causes the file to be given a new file path. The library 408 can provide an update DAC system call 908 to the kernel 310. The kernel 310 can, in response, issue an update DAC call 910 to the DAC 414. The library 408 can provide an update MAC system call 912 to the kernel 310. The kernel 310 can, in response, issue an update MAC call 914 to the MAC 416 that causes the MAC permissions to be updated with a new file type. The library 408 can provide a unique access check system call 916. The kernel 310 can, in response, issue or respond to system calls 918 that cause the hardware to provide data regarding whether any other processes have the file open, memory maps have the renamed file (or an associated file) open, and/or no other processes have a file descriptor with the file open. At operation 920, the kernel 310, such as by using the processing circuitry 312, can determine whether the UAC passed or failed. The kernel 310 can provide the process B 204 an indication of whether the check passed or failed using communication 922.

Note that, while not shown in FIG. 8 or 9, each system call can include a response indicating of whether the system call was successful or failed. These responses can be provided to the library 408 and/or the process 204. After the process B 204 is done accessing the file, a MAC update can be performed to alter the file type, such as to indicate that the file is checked back in. After the process B 204 is done accessing the file, a DAC update can be performed, such as to change the owner and/or change permissions of the file, such that another process can gain access to the file.

Modules, Components and Logic

Certain embodiments are described herein as including logic, components, circuitry, modules, or mechanisms. Modules may constitute either software modules (e.g., code embodied (1) on a non-transitory machine-readable medium or (2) in a transmission signal) or hardware-implemented modules. A hardware-implemented module is tangible unit capable of performing certain operations and may be configured or arranged in a certain manner. In example embodiments, one or more computer systems (e.g., a standalone, client or server computer system), one or more processors, or circuitry may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations, such as operations discussed herein. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules may provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses) that connect the hardware-implemented modules. In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and may operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs)).

Example embodiments may be implemented in digital electronic circuitry, or in computer hardware, firmware, software, or in combinations of them. Example embodiments may be implemented using a computer program product, (e.g., a computer program tangibly embodied in an information carrier, e.g., in a machine-readable medium for execution by, or to control the operation of, data processing apparatus, e.g., a programmable processor, a computer, or multiple computers).

A computer program may be written in any form of programming language, including compiled or interpreted languages, and it may be deployed in any form, including as a stand-alone program or as a module, subroutine, or other unit suitable for use in a computing environment. A computer program may be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations may also be performed by, and apparatus of example embodiments may be implemented as, special purpose logic circuitry, e.g., a field programmable gate array (FPGA) or an application-specific integrated circuit (ASIC).

The computing system may include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Figure 10:
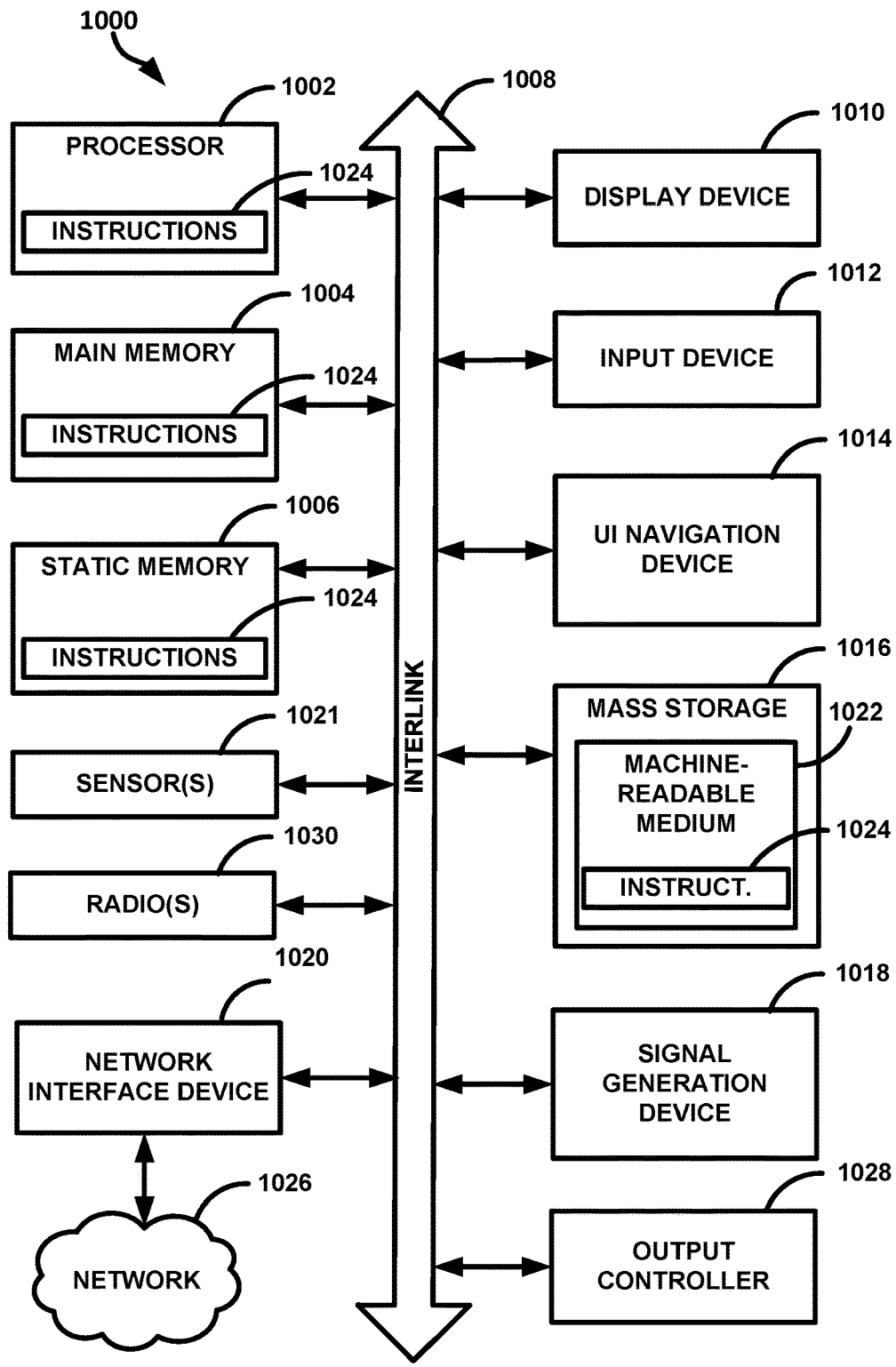
FIG. 10 illustrates, by way of example, a block diagram of an embodiment of a machine in the example form of a machine (e.g., a device) within which instructions, for causing the machine to perform any one or more of the methodologies discussed herein, may be executed.

FIG. 10 illustrates, by way of example, a block diagram of an embodiment of a machine in the example form of a machine 1000 (e.g., a device) within which instructions, for causing the machine to perform any one or more of the methodologies discussed herein, may be executed. In one or more embodiments, one or more of the processing circuitry 312 or other hardware 406 can include one or more components of the machine 1000. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example machine 1000 includes a processor 1002 (e.g., a central processing unit (CPU), a graphics processing unit (GPU) or both), a main memory 1004 and a static memory 1006, which communicate with each other via a bus 1008. The machine 1000 may further include a video display unit 1010 (e.g., a liquid crystal display (LCD) or a cathode ray tube (CRT)). The machine 1000 also includes an alphanumeric input device 1012 (e.g., a keyboard), a user interface (UI) navigation device 1014 (e.g., a mouse), a storage device 1016, a signal generation device 1018 (e.g., a speaker), a network interface device 1020, and radios 1030 such as Bluetooth, wireless wide area network (WWAN), wireless local area network (WLAN), and near field communication (NEC), permitting the application of security controls on such protocols.

The storage device 1016 includes a machine-readable medium 1022 on which is stored one or more sets of instructions and data structures (e.g., software) 1024 embodying or utilized by any one or more of the methodologies or functions described herein. The instructions 1024 may also reside, completely or at least partially, within the main memory 1004 and/or within the processor 1002 during execution thereof by the machine 1000, the main memory 1004 and the processor 1002 also constituting machine-readable media.

While the machine-readable medium 1022 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding or carrying instructions for execution by the machine and that cause the machine to perform any one or more of the methodologies of the present invention, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and CD-ROM and DVD-ROM disks.

The instructions 1024 may further be transmitted or received over a communications network 1026 using a transmission medium. The instructions 1024 may be transmitted using the network interface device 1020 and any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., WiFi and WiMax networks). The term "transmission medium" shall be taken to include any intangible medium that is capable of storing, encoding or carrying instructions for execution by the machine, and includes digital or analog communications signals or other intangible media to facilitate communication of such software.

EXAMPLES AND ADDITIONAL NOTES

Example 1 includes a device comprising a kernel, a memory comprising user spaces allocated for access by a respective plurality of processes including a first process and a second process and a kernel space allocated for access by the kernel, the kernel space including access controls, processing circuitry to implement instructions issued by the kernel, the first process, and the second process, the processing circuitry to: issue one or more move and rename instructions to the memory to change a location and name of a file requested by the second process, issue one or more update access control instructions to update the access controls, perform a unique access check (UAC) to determine whether any processes other than the second process currently have the file open and whether any memory maps (MMaps) have the file open, and allow the second process to access the renamed and moved file only if it is determined that (1) no other processes other than the second process have the file open and (2) no MMaps have the file open, In Example 2, Example 1 further includes, wherein the access controls include discretionary access controls (DAC) and mandatory access controls (MAC), wherein issuing one or more update access control instructions to update the access controls includes issuing one or more DAC update instructions to update the DAC and issuing one or more MAC update instructions to update the MAC.

In Example 3, Example 2 further includes, wherein issuing the one or more DAC update instructions occurs and completes before issuing the one or more MAC update instructions.

In Example 4, Example 3 further includes, wherein issuing the one or more MAC update instructions occurs and completes before performing the UAC.

In Example 5, at least one of Examples 2-4 further includes, wherein the one or more MAC update instructions include one or more system calls to change a security policy type associated with the renamed and moved file.

In Example 6, at least one of Examples 2-5 further includes, wherein the one or more DAC update instructions include an instruction to change ownership of the file.

In Example 7, at least one of Examples 2-6 further includes, wherein the one or more DAC update instructions includes an instruction that allows no group access to the file and no other users to access the file.

In Example 8, at least one of Examples 2-7 further includes, wherein the one or more MAC update instructions include an instruction that alters a file type of the file.

In Example 9, at least one of Examples 1-8 further includes, wherein the processing circuitry is further to delete the renamed and moved file in response to determining that one or more of (1) another process has the file open, (2) an MMap has the file open, (3) more than one hard link to the file exists, and (4) another error occurs during a process of moving the file to the second process.

In Example 10, at least one of Examples 1-9 further includes, wherein the unique access check includes determining if an inode of the renamed and moved file indicates that a second file is associated with the inode, determining if any processes currently have the inode open and whether any memory maps (MMaps) have the inode open, and allowing the second process to access the renamed and moved file only if it is determined that (1) no other processes have either of the file and the second file open (2) no MMaps have either of the file and the second file open, (3) only one hard link to the file exists, and (4) no errors occurred during a process of moving the file to the second process.

In Example 11, at least one of Examples 1-10 further includes, wherein the UAC includes determining a number of hard links to an inode associated with the file and detecting whether any file descriptors (fds) for the same node are open in other processes than the second process and whether any MMaps for the same inode are open in other processes other than the second process.

In Example 12, at least one of Examples 1-11 further includes, wherein the unique access check is performed using instructions stored in the kernel space.

Example 13 includes a non-transitory machine-readable storage device including instructions stored thereon that, when executed by processing circuitry, configure the processing circuitry to issue one or more move and rename instructions to a memory to change a location and name of a file requested by a second process, issue one or more update DAC instructions to update permissions in the DAC, issue a MAC instruction to update a permission in the MAC, perform a unique access check (UAC) to determine whether any processes other than the second process currently have the file open and whether any memory maps (MMaps) have the file open, and allow the second process to access the renamed and moved file only if it is determined that (1) no other processes other than the second process have the file open and (2) no MMaps have the file open.

In Example 14, Example 13 further includes, wherein issuing the update DAC instruction occurs and completes before issuing the update MAC instruction.

In Example 15, Example 14 further includes, wherein issuing the update MAC instruction occurs and completes before performing the UAC.

In Example 16, at least one of Examples 13-15 can further include instructions that, when executed by the processing circuitry, configure the processing circuitry to delete the renamed and moved file in response to determining that one or more of (1) another process has the file open, (2) an MMap has the file open, (3) more than one hard link to the file exists, and (4) another error occurs during a process of moving the file to the second process.

In Example 17, at least one of Examples 13-16 further includes, wherein the instructions for performing the unique access check include instructions for determining if an inode of the renamed and moved file indicates that a second file is associated with the inode, determining if any processes currently have the inode open and whether any memory maps (MMaps) have the inode open, and allowing the second process to access the renamed and moved file only if it is determined that (1) no other processes have either of the file and the second file open (2) no MMaps have either of the file and the second file open, (3) only one hard link to the file exists, and (4) no errors occurred during a process of moving the file to the second process.

In Example 18, at least one of Examples 13-17 further includes, wherein the instructions for performing the UAC include instructions for determining a number of hard links to an inode associated with the file and detecting whether any file descriptors (fds) for the same inode are open in other processes than the second process and whether any MMaps for the same inode are open in other processes other than the second process.

In Example 19, at least one of Examples 13-18 further includes, wherein the unique access check is performed using instructions stored in the kernel space.

In Example 20, at least one of Examples 13-19 further includes, wherein the one or more instructions issued to update the MAC include system calls to change a security policy type associated with the renamed and moved file.

In Example 21, at least one of Examples 14-20 further includes, wherein the one or more instructions issued to update the DAC include instructions to change ownership of the file.

In Example 22, at least one of Examples 14-21 further includes, instructions that, when executed by the processing circuitry, configure the processing circuitry to issue one or more second update MAC commands to update permissions in the MAC and issue one or more second update DAC commands to update permissions in the DAC in response to the second process closing the renamed and moved file.

In Example 23, at least one of Examples 13-22 further includes, wherein the DAC update instruction includes a command that allows no group access to the file and no other users to access the file.

In Example 24, at least one of Examples 13-23 further includes, wherein the MAC update instruction includes an instruction that alters a file type of the file.

Example 25 includes a method for moving a file within a computer device to help ensure directionality and non-bypassbility, the method comprising issuing one or more move and rename instructions to the memory to change a location and name of a file requested by a first process, the memory comprising user spaces allocated for access by a respective plurality of processes including the first process and a kernel space allocated for access by a kernel, the kernel space including discretionary access controls (DAC) and mandatory access controls (MAC), issuing one or more update DAC instructions to update permissions in the DAC, issuing an update MAC instruction to update a permission in the MAC, performing a unique access check (UAC) to determine whether any processes other than the first process currently have the file open, whether any memory maps (MMaps) have the file open, and whether any processes other than the first process have a file descriptor with the file open, and allow the first process to access the renamed and moved file only if it is determined that (1) no other processes other than the first process have the file open, (2) no MMaps have the file open, and (3) no processes other than the first process have the file descriptor with the file open.

In Example 26, Example 25 further includes, wherein issuing the update DAC instruction occurs and completes before issuing the update MAC instruction.

In Example 27, Example 26 further includes, wherein issuing the update MAC instruction occurs and completes before performing the UAC.

In Example 28, at least one of Examples 25-27 further includes deleting the renamed and moved file in response to determining that one or more of (1) another process has the file open, (2) an MMap has the file open, (3) more than one hard link to the file exists, and (4) another error occurs during a process of moving the file to the second process.

In Example 29, at least one of Examples 25-28 further includes, wherein performing the unique access check includes determining if an inode of the renamed and moved file indicates that a second file is associated with the inode, determining if any processes currently have the inode open and whether any memory maps (MMaps) have the inode open, and allowing the second process to access the renamed and moved file only if it is determined that (1) no other processes have either of the file and the second file open (2) no MMaps have either of the file and the second file open, (3) only one hard link to the file exists, and (4) no errors occurred during a process of moving the file to the second process.

In Example 30, at least one of Examples 25-29 further includes, wherein performing the UAC includes determining a number of hard links to an inode associated with the file and detecting whether any file descriptors (fds) for the same inode are open in processes other than the second process and whether any MMaps for the same inode are open in other processes other than the second process.

In Example 31, at least one of Examples 25-30 further includes, wherein the unique access check is performed using instructions stored in the kernel space.

In Example 32, at least one of Examples 25-31 further includes, wherein the one or more instructions issued to update the MAC include system calls to change a security policy type associated with the renamed and moved file.

In Example 33, at least one of Examples 26-32 further includes, wherein the one or more instructions issued to update the DAC include instructions to change ownership of the file.

In Example 34, at least one of Examples 26-33 further includes issuing one or more second update MAC instructions to update permissions in the MAC and issuing one or more second update DAC instructions to update permissions in the DAC in response to the second process closing the renamed and moved file.

In Example 35, at least one of Examples 25-34 further includes, wherein the DAC update instruction includes an instruction that allows no group access to the file and no other users to access the file.

In Example 36, at least one of Examples 25-35 further includes, wherein the MAC update instruction includes an instruction that alters a file type of the file.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

What is claimed is:

1. A method for moving a file within a computing device to help ensure directionality and non-bypassbility, the method comprising:
    issuing one or more move and rename instructions to the memory to change a location and name of a file requested by a first process, the memory comprising user spaces allocated for access by a respective plurality of processes including the first process and a kernel space allocated for access by a kernel, the kernel space including discretionary access controls (DAC) and mandatory access controls (MAC);
    issuing one or more update DAC instructions to update permissions in the DAC;
    issuing an update MAC instruction to update a permission in the MAC;
    performing a unique access check (UAC) to determine whether any other processes, other than the first process, currently have the file open, whether any memory maps (MMaps) have the file open, and detecting whether any file descriptors (fds) for the file are open in any of the other processes; and
    allow the first process to access the renamed and moved file only if it is determined that (1) no other processes other than the first process have the file open, (2) no MMaps have the file open, and (3) no other process other than the first process includes fds with the file open.

2. The method of claim 1, wherein performing the UAC includes:
    determining if an inode of the renamed and moved file indicates that a second file is associated with the inode,
    determining if any processes currently have the inode open and whether any memory maps (MMaps) have the inode open, and
    allowing a second process to access the renamed and moved file only if it is determined that (1) no other processes have either of the file and the second file open (2) no MMaps have either of the file and the second file open, (3) only one hard link to the file exists, and (4) no errors occurred during a process of moving the file to the second process.

3. The method of claim 1, wherein performing the UAC includes:
    determining a number of hard links to an inode associated with the file, and
    detecting whether any file descriptors (fds) for the same inode are open in other processes other than a second process and whether any MMaps for the same inode are open in other processes other than the second process.

4. The method of claim 1, wherein:
    updating the MAC includes one or more system calls to change a security policy type associated with the renamed and moved file, and
    updating the DAC includes one or more system calls to change ownership of the file.

5. A device comprising:
    a kernel;
    a memory comprising user spaces allocated for access by a respective plurality of processes including a first process and a second process and a kernel space allocated for access by the kernel, the kernel space including access controls;
    processing circuitry to implement instructions issued by the kernel, the first process, and the second process, the processing circuitry to:
    issue one or more move and rename instructions to the memory to change a location and name of a file requested by the second process;
    issue one or more update access control instructions to update the access controls;
    perform a unique access check (UAC) to determine whether any processes other than the second process currently have the file open and whether any memory maps (MMaps) have the file open; and
    allow the second process to access the renamed and moved file only if it is determined that (1) no other processes other than the second process have the file open and (2) no MMaps have the file open.

6. The device of claim 5, wherein:
    the access controls include discretionary access controls (DAC) and mandatory access controls (MAC), and
    issuing one or more update access control instructions to update the access controls includes issuing one or more DAC update instructions to update the DAC and issuing one or more MAC update instructions to update the MAC.

7. The device of claim 6,
    wherein issuing the one or more DAC update instructions occurs and completes before issuing the one or more MAC update instructions.

8. The device of claim 7,
    wherein issuing the one or more MAC update instructions occurs and completes before performing the UAC.

9. The device of claim 6,
    wherein the one or more MAC update instructions include one or more system calls to change a security policy type associated with the renamed and moved file.

10. The device of claim 6,
    wherein the one or more DAC update instructions include an instruction to change ownership of the file.

11. The device of claim 6,
    wherein the one or more DAC update instructions includes an instruction that allows no group access to the file and no other users to access the file.

12. The device of claim 6,
    wherein the one or more MAC update instructions include an instruction that alters a file type of the file.

13. The device of claim 5, wherein the processing circuitry is further to:
    delete the renamed and moved file in response to determining that one or more of (1) another process has the file open, (2) an MMap has the file open, (3) more than one hard link to the file exists, and (4) another error occurs during a process of moving the file to the second process.

14. The device of claim 5, wherein the unique access check includes:
    determining if an inode of the renamed and moved file indicates that a second file is associated with the inode,
    determining if any processes currently have the inode open and whether any memory maps (MMaps) have the inode open, and
    allowing the second process to access the renamed and moved file only if it is determined that (1) no other processes have either of the file and the second file open (2) no MMaps have either of the file and the second file open, (3) only one hard link to the file exists, and (4) no errors occurred during a process of moving the file to the second process.

15. The device of claim 5, wherein the UAC includes:
    determining a number of hard links to an inode associated with the file, and
    detecting whether any file descriptors (fds) for the same inode are open in other processes than the second process and whether any MMaps for the same inode are open in other processes other than the second process.

16. The device of claim 5,
    wherein the unique access check is performed using instructions stored in the kernel space.

17. A non-transitory machine-readable storage device including instructions stored thereon that, when executed by processing circuitry, configure the processing circuitry to:
    issue one or more move and rename instructions to a memory to change a location and name of a file requested by a process;
    issue one or more update DAC instructions to update permissions in the DAC;
    issue a MAC instruction to update a permission in the MAC;
    perform a unique access check (VAC) to determine whether any processes other than the process currently have the file open and whether any memory maps (MMaps) have the file open; and
    allow the process to access the renamed and moved file only if it is determined that (1) no other processes other than the process have the file open and (2) no MMaps have the file open.

18. The storage device of claim 17,
    wherein issuing the update DAC instruction occurs and completes before issuing the update MAC instruction.

19. The storage device of claim 18,
    wherein issuing the update MAC instruction occurs and completes before performing the UAC.

20. The storage device of claim 17, further comprising instructions that, when executed by the processing circuitry, configure the processing circuitry to:
    delete the renamed and moved file in response to determining that one or more of (1) another process has the file open, (2) an MMap has the file open, (3) more than one hard link to the file exists, and (4) another error occurs during a process of moving the file to the process.

\* \* \* \* \*

UNITED STATES PATENT AND TRADEMARK OFFICE
CERTIFICATE OF CORRECTION

PATENT NO. : 10,318,209 B2
APPLICATION NO. : 15/419093
DATED : June 11, 2019
INVENTOR(S) : Gregory Alan Hildstrom Page 1 of 2

It is certified that error appears in the above-identified patent and that said Letters Patent is hereby corrected as shown below:

In the Specification

Column 2, Line 21, delete "my" and insert --mv-- therefor

Column 3, Line 55, delete "the," and insert --the-- therefor

Column 4, Line 33, delete "sonic" and insert --some-- therefor

Column 5, Line 17, delete "Iseek( )system" and insert --Iseek( ) system-- therefor Column 6, Line 30, delete "204" and insert --202-- therefor Column 6, Line 40, delete "210," and insert --310,-- therefor Column 6, Line 66, delete "life." and insert --like.-- therefor Column 8, Line 61, delete "110" and insert --I/O-- therefor Column 9, Line 57, delete "snaking" and insert --making-- therefor Column 11, Line 4, delete "process 204." and insert --process B 204.-- therefor Column 13, Line 37, after "may", insert --be--

Column 13, Line 61, delete "(NEC)," and insert --(NFC),-- therefor

Column 14, Line 64, delete "open," and insert --open.-- therefor

Column 15, Line 49, delete "node" and insert --inode-- therefor

Signed and Sealed this
Eighth Day of December, 2020

Andrei Iancu
*Director of the United States Patent and Trademark Office*

In the Claims

Column 20, Line 48, in Claim 17, delete "(VAC)" and insert --(UAC)-- therefor